United States Patent [19]

Datschefski

[11] 4,299,363
[45] Nov. 10, 1981

[54] CONNECTOR FOR NON-METALLIC SHEATHED CABLE

[75] Inventor: Arthur E. Datschefski, South Bend, Ind.

[73] Assignee: Raco, Inc.

[21] Appl. No.: 88,635

[22] Filed: Oct. 26, 1979

[51] Int. Cl.³ .............................................. H02G 3/22
[52] U.S. Cl. .......................................... 248/56; 16/2;
174/65 G; 174/153 G
[58] Field of Search ............... 16/2; 285/162; 248/56;
174/153 G, 152 G, 65 G

[56] References Cited

U.S. PATENT DOCUMENTS

| | | | |
|---|---|---|---|
| 2,420,826 | 5/1947 | Irrgang | 174/153 G |
| 2,458,409 | 1/1949 | Paige | |
| 2,545,514 | 3/1951 | Erb | 174/153 G |
| 2,707,723 | 5/1955 | Moorhead | 174/153 G |
| 2,948,937 | 8/1960 | Rapata | |
| 3,197,556 | 7/1965 | Simon | 248/56 X |
| 3,351,974 | 11/1967 | Wilhelmi | |
| 3,506,999 | 4/1970 | Neher | 16/2 |
| 3,516,111 | 6/1970 | Heyman | |
| 3,768,115 | 10/1973 | Hoffmann et al. | 16/2 |
| 3,788,655 | 1/1974 | Hathaway | |
| 3,991,446 | 11/1976 | Mooney et al. | |

FOREIGN PATENT DOCUMENTS

| | | | |
|---|---|---|---|
| 2211041 | 2/1973 | Fed. Rep. of Germany | 285/162 |
| 262532 | 12/1926 | United Kingdom | 174/65 G |
| 1122395 | 8/1968 | United Kingdom | 16/2 |

Primary Examiner—Thomas Callaghan
Attorney, Agent, or Firm—McWilliams; Mann; Zummer

[57] ABSTRACT

A connector for connecting non-metallic sheathed cable of both the round and oval types to electrical boxes in which the connector is of all plastic, one piece construction, free of clamps and screwing, and comprises a ring shaped segmented body defining a collet like cable gripping portion comprising a plurality of pairs of opposed resilient jaws in which the jaws each comprise a finger having a split base portion projecting from one end of the body and a jaw head directed laterally of and toward the body axis such that the jaw heads are grouped together, collet fashion, in spaced apart relation. The collet jaws are shaped to integrally connect together the body segments for reducing the diameter of the body for application purposes, and the jaws are formed for snap fit mounting of the connector in a knock-out opening of the box, they being arranged to be sprung apart to accept and pass the end of a cable being thrust through the connector for reception in the box. The jaws act to be drawn together and set against the cable when the cable is subject to movement tendencies outwardly of the box, to hold the cable end within the box, and without requiring clamps or crimping devices in connection therewith.

9 Claims, 10 Drawing Figures

CONNECTOR FOR NON-METALLIC SHEATHED CABLE

This invention relates to a connector for connecting non-metallic sheathed cable to electrical boxes, and more specifically, to a connector for securing such cable in knock-out openings of conventional electrical boxes.

Non-metallic sheathed cable is a troublesome thing to connect to outlet boxes, as the sheathing, being ordinarily formed from a plastic polymeric material, is not suitable for direct mechanical correction to the box walls. Connectors to be practical for use with this type cable must not employ metallic grippers that could penetrate the sheathing, and they must also accommodate the familiar oval as well as the round transverse cross-sectional configurations that common versions of this cable have.

Consequently, conventional connectors for non-metallic sheathed cable ordinarily involve some form of mechanical clamp arrangement, or cable crimping arrangement, which involves at least one and sometimes several separate moving parts. Furthermore, conventional connectors of this type are not suitable for use in connection with both round and oval cable as the needed clamping and crimping devices commonly employed have to be shaped in accordance with whether the cable to be connected to the box is either round or oval.

A principal object of this invention is to provide a connector arranged for connecting non-metallic sheathed cable to electrical boxes that freely accepts the cable end for applying the cable end to the box, and that acts to restrain the cable against movement out of the box by a circumferential gripping action on the cable that avoids the need for other clamping and crimping arrangements while providing a connector that accepts both oval and round cable of the non-metallic sheathed cable type.

Another important object of the invention is to provide a cable connector of the type indicated that is of one piece construction, and that is in the nature of a contractable collet arranged for snap fitting application to the box knock-out opening, and to accommodate movement of the cable through the connector into the box while precluding withdrawal of the cable therefrom.

Other important objects of the invention are to provide a simple but effective cable connector for non-metallic sheathed cable that involves collet like jaws that have their inner surfacings arranged to provide for only unidirectional movement of the cable with respect to the connector, and that have their outer surfacings arranged to serve the additional function of providing for snap fit application of the connector to the box.

Still other objects of the invention are to provide a connector for non-metallic sheathed cable that may be applied to both metallic and molded plastic boxes, that accepts both round and oval cable at any convenient cable orientation (about the central axis of the connector) while providing for firm securement of the cable to the box and ready adaptability to a wide range of knock-out opening tolerances, and that is economical of manufacture, convenient to install and use, and requires no cable clamping or crimping devices to securely hold the cable in place.

In accordance with the invention, the connector comprises a ring shaped or annular body of one piece segmented construction including unidirectional cable movement accommodating collet comprising a plurality of pairs of opposed resilient jaws, in which the jaws each comprise a finger having a slotted base portion projecting from one end of the body and a jaw head directed laterally of and toward the body axis, such that the jaw heads are grouped together in spaced collet like relation. The collect jaws are shaped to integrally connect together the body segments for contractably orienting same for box application purposes, and to have their outer surfacings arranged for snap fit mounting of the connector in box knock-out openings of varying tolerances without the need for special application tools. The jaw heads of the jaws are shaped for insuring that the connector will have a firm holding action on the cable without danger of penetration of the cable sheathing, and without the installer having to always specifically orient the cable relative to specific jaws.

The jaw fingers each have on their outwardly facing surfacing a circumferential recess, with the indicated recesses being adjacent to the connector body segments and aligned in a common plane extending transversely of the body axis to define in the connector a circumferential seat adapted to receive the margin of the box wall providing the knock-out opening; the jaw fingers involved each further define, on their outwardly facing surfacing, cam surfacing interposed between the jaw head and recess thereof, whereby the respective jaw fingers and the body segments may be cammed toward each other, by the box wall knock-out opening defining margin, for snap fit application of the connector to the box knock-out opening to seat the indicated box wall opening margin in the indicated connector seat. The connector jaws are oriented relative to the connector body such that, when the connector is applied to the box knock-out opening, the connector jaws extend inwardly of the box.

The connector collet arrangement is such that a cable end of sheathed cable of either oval or round transverse cross-sectional configuration may be inserted into the box through the connector (applied thereto in accordance with the invention) by aligning the cable end with the collet jaws, and thrusting the cable end against the connector jaw heads from outside of the box to separate the collet jaws to pass the cable end into the box. The connector is made from resiliently flexible material and the proportioning of the parts is such that while the connector jaws slidably accommodate movement of the cable end into the box, the jaw heads of the collet are resiliently seated against the cable end, and are oriented to be drawn against the cable end by the jaws indenting into the cable, on tendencies of the cable end to be moved outwardly of the box.

The collet jaws define opposed gripping rim portions of blunt configuration that bear against the cable sheathing, shaped such that the jaws do not penetrate the cable sheathing, while providing for some localized indenting of the sheathing as part of the secure holding action of the connector on the cable.

The arrangement of the collet jaws is thus such as to accept round cable as well as oval cable with equal facility, and provide a similar type of movement restraining action on both types of cable.

The connector is adapted for application to both metallic and molded plastic boxes and requires no special tools or training to apply same to the box.

Other objects, uses, and advantages will be obvious or become apparent from a consideration of the following detailed description and the application drawings.

However, it is to be understood that the specific drawing illustrations provided are supplied primarily to comply with the requirements of the Patent Laws, and that the invention is susceptible of various modifications that will be obvious to those skilled in the art, and which are intended to be covered by the appended claims.

Figure 7:
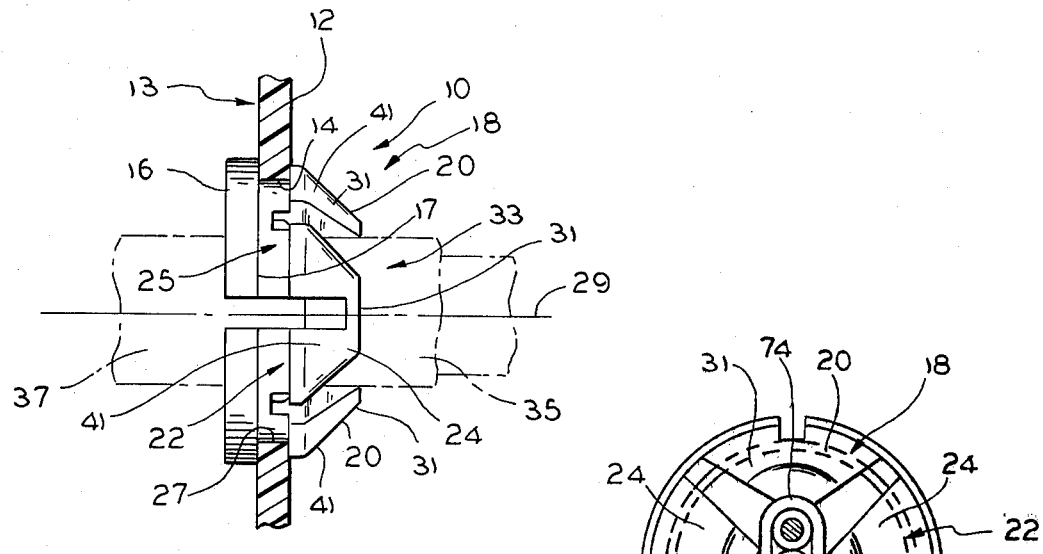
FIG. 7 is a view of the connector shown as in FIG. 1, with a cable of oval transverse cross-sectional configuration applied thereto, with the cable end being shown in outline.

Reference numeral 10 generally indicates a preferred embodiment of the invention, that in FIG. 7 is shown applied to a wall 12 of a box 13 (of which only the indicated portion of wall 12 is shown), and specifically within the knock-out opening 14 that is formed in the box. The knock-out opening 14 is shown formed in a molded plastic box and this may be done in any manner usual and customary for plastic molded box knock-out openings. While the box 13 is of the molded plastic type, the invention is equally applicable to metal boxes, and specifically to the outlet openings of metal boxes as formed in any usual and customary manner for metal boxes.

The connector 10 comprises a generally ring shaped body 16 of segmented relation, from one side 17 of which project a first pair 18 of opposed jaws 20, and a second pair 22 of opposed jaws 24. The body member 16 and the pairs of jaws 18 and 22 are formed to define a seat 25 in which the box wall rim portion 27 that defines the outlet opening 14 is received to mount the connector 10 in the box, and specifically in its outlet opening 14. The other side 19 of body 16 is of plain annular, though segmented, configuration and faces away from jaws 20 and 24.

The ring shaped body 16 and the pairs of jaws 20 and 24 are integrally connected; the device 10 is thus of one piece construction and is preferably formed from a suitable plastic material of the polymeric type such as nylon or the like. Nylon is one of several materials that provide the desired resilient flexibility, self-lubricating and dielectric qualities, and corrosion resistant and non-metallic nature that are preferred for practicing the invention.

The pairs of jaws 18 and 22 are arranged concentrically about the central axis 29 of the body 16 and each comprises a collet finger 28 including a base 26 and a jaw head 31 to form a self acting collet 33 for receiving the end 35 of the non-metallic sheathed cable 37 that is to be applied to the box 13, and hold same against withdrawal from the box, as will be described hereinafter.

As indicated in the drawings, the fingers 28 forming the respective jaws 20 and 24 at their bases 26 extend axially of the body member 16 for a short distance, and then angle towards mutual convergence about the axis 29 in a more or less common plane that extends transversely of axis 29, and parallels the plane of body 16, in the unstressed condition of the jaws 18 and 24.

The outer sides of the fingers 28 are formed to define curvilinearly contoured convexly shaped cam surfaces 41 for cooperation with the box wall margin 27 in applying the connector to the box outlet opening 14, as will be described hereinafter. At the finger bases 26, the fingers 28 are recessed as at 30, with the recesses 30 and body rim 16A together forming the connector seat 25 that receives the box wall marginal rim portion 27. It will be seen that the connector seat 25 is partially defined by the finger shoulders 28A that are defined by the respective recesses 30.

Figure 2:
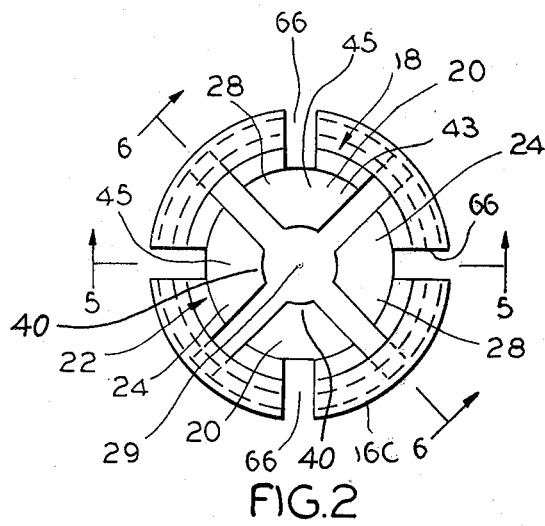
FIG. 2 is a plan view of the connector shown in FIG. 1, viewed as seen from the left hand side of FIG. 1.
Figure 5:
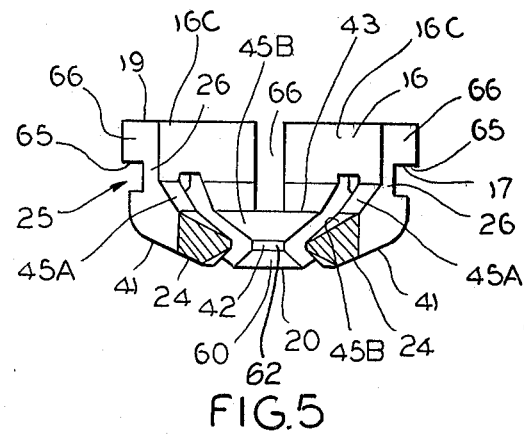
FIG. 5 is a sectional view of the connector taken substantially along line 5—5 of FIG. 2.
Figure 6:
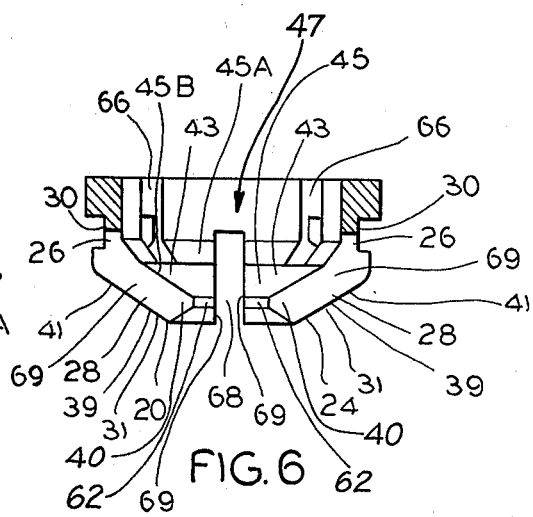
FIG. 6 is a sectional view of the connector, taken substantially along line 6—6 of FIG. 2.

The inner sides 43 of the fingers 28 are formed with consecutive angled cam surfaces 45A and 45B that are angled away from the body 16, inwardly of axis 29, with the respective sets of surfaces 45A and 45B, of the individual fingers 28, forming segments of frusto-conical surfaces, as indicated in FIGS. 2, 5 and 6. Thus, the surfaces 45A are struck about a common surface of revolution that is frusto-conically contoured, and has its central axis aligned with axis 29, while the surfaces 45B are struck about a common surface of revolution that is also frusto-conically contoured at an increased angle of inclination relative to body 16, and that has its central axis also aligned with axis 29. Body member 16 and the fingers 28 define bore 47 that leads to the inner sides of jaw heads 31.

The jaw heads 31 of the pairs of jaws 18 and 22 are formed to define end portions 40 each of which is formed with an arcuate rim portion 42, with the rim portions 42 being struck about a common surface of revolution that is centered on axis 29.

As indicated in FIGS. 3, 5, 6 and 8-10, the outer sides of the jaw heads 31 of both pair of jaws are given the concave surfacing indicated at 60 that is frusto-conically contoured in nature. The surfacings 60 are struck about a common external concave surface of revolution that is centered on the axis 29. The surfaces 45B and 60 are oriented such that the jaw rim portions 42, while being struck on a cylindrical surface of revolution centered on axis 29, are of limited dimension axially of connector 10. The jaw rim portions 42 thus shape rim portions 42 that define blunt jaw gripping edges 62 that are the portions of the jaws 20 and 24 that seat against the cable sheathing when the cable end 37 has been inserted into the box as indicated in FIG. 7.

Figure 3:
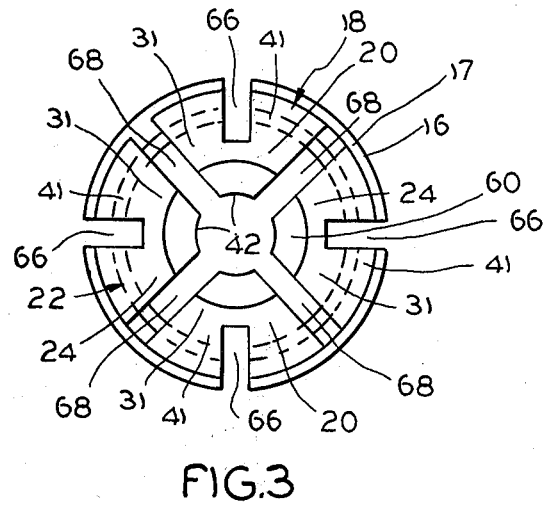
FIG. 3 is a plan view of the connector shown in FIG. 1, viewed as seen from the right hand side of FIG. 1.

The body 16 is formed with a plurality of marginal slots 66, with the respective slots 66 extending parallel to the axis 29 of the connector, longitudinally thereof, and each slot 66 being centered on the respective jaws 20 and 24 (see FIGS. 2 and 3). Slots 66 are of sufficient depth, radially of axis 29, to subdivide body 16 into segments 16C and extend well into jaw heads 31 (see FIG. 5).

The fingers 28 are separated by cross spaces 68, which thus define the sides 69 of the respective fingers 28. While the fingers 28 are subdivided by the respective slots 66, the resulting finger sections 28A are integral with the body segments 16C adjacent same, so that connector 10 is of one piece construction. However, the resiliently flexible nature of the material from which connector 10 is made accommodates flexing of body segments 16C radially of axis 29, which facilitates the snap fitting of the connector to the box, and permits the connector to be applicable to a wide range of knock-out tolerances.

The body side 17 defines segmented abutment surfacing 65 thereabout that forms part of seat 25 and seats against the outside surface 70 of the box wall 12 when the connector 10 is applied to the box.

The connector 10 is applied to the box, as for instance box 13, from the outside surface 70 of same, by appropriately opening up the knock-out opening 14, and then taking the connector 10, centering its fingers 28 on the knock-out opening with the cam surfaces 41 placed against the outer margin of the knock-out opening at the box outer surface 70, and then pressing the connector inwardly of the box or to the right of FIG. 7 to cam the fingers 28 toward each other sufficiently so that the box wall margin 27 defining the knock-out opening 14 slips snap fit fashion into the connector seat 25, and specifically into the recesses 30 between the respective shoulders 30A and body rim segments 16C to seat the connector 10 in the box knock-out opening 14. Body segments 16C adjust radially of axis 29 as needed by the relative size of the knock-out opening to which the connector 10 is applied.

The connector 10 being formed from resiliently flexible material, after the connector is snap fitted in place in the box, the fingers 28 return under their built in resilient bias to the substantially normal positioning indicated in FIGS. 1–6. As already indicated, in the cable free positioning of the fingers 28, the jaw heads 31 are more or less aligned in a common plane that is disposed transversely of the axis 29 and that substantially parallels the plane of body 16. The jaw heads 31 are also spaced from the plane of seat 25, whereby they are free to flex outwardly of axis 29 when cable 37 is to be applied to the connector, as described hereinafter.

The connector 10 in accordance with the invention is adapted to be applied to the box knock-out opening without using any special tools, and normally finger pressing acting on the body 16, and specifically against its side 19, is adequate to effect mounting of the connector in the box. This may be facilitated when necessary by a light tapping action on the side 19 of body member 16 with a hammer where the sizing of the knock-out opening is somewhat smaller than will accommodate finger pressure application of the connector to the box knock-out opening.

Assuming that the end 35 of a length of non-metallic sheathed cable 37 of the oval transverse cross-sectional configuration indicated in FIG. 7 is to be applied to the box 13 through the connector 10, the installer grasps the cable 37 adjacent the cable end 35, and presses the cable end 35 against the inside cam surfacing 45A and 45B of jaws 18 and 22 to force them apart to receive and pass the cable end.

Figure 8:
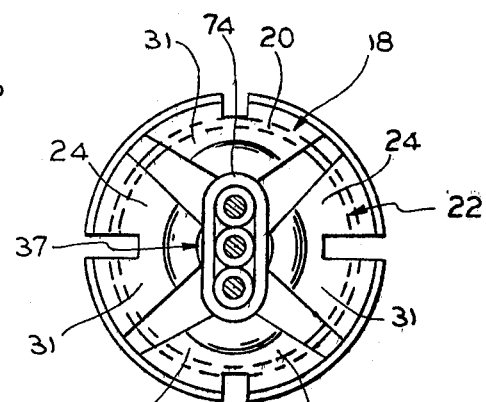
FIG. 8 is a plan view of the connector, showing same as viewed from the right hand side of FIG. 1, and illustrating in outline a cable of oval transverse cross-sectional configuration in one position of application thereto.
Figure 9:
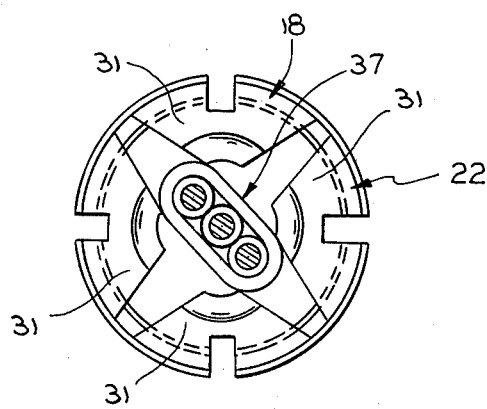
FIG. 9 is a view similar to that of FIG. 8, but illustrating another position of application of oval cable thereto; and, FIG. 10 is a view similar to that of FIG. 8, but illustrating a cable of round transverse cross-sectional configuration applied to the connector.

In this connection, the jaws 18 and 22 are arranged to receive the cable end 35 in any random or selected position of orientation about the axis 29 for complete convenience in applying the cable to the connector 10, several of such positions being indicated in FIGS. 8 and 9, for cable of oval transverse cross-sectional configuration.

Figure 1:
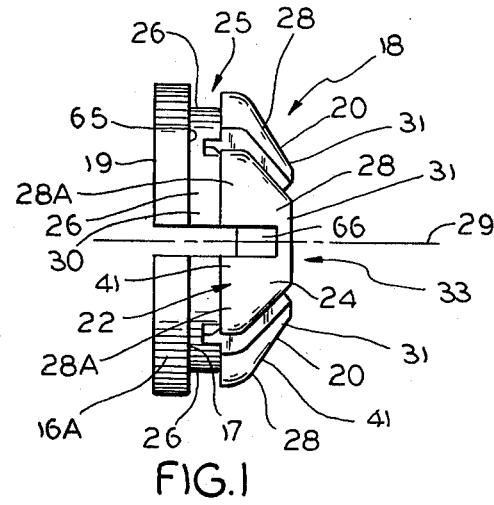
FIG. 1 is a side elevational view of a preferred embodiment of the invention.
Figure 4:
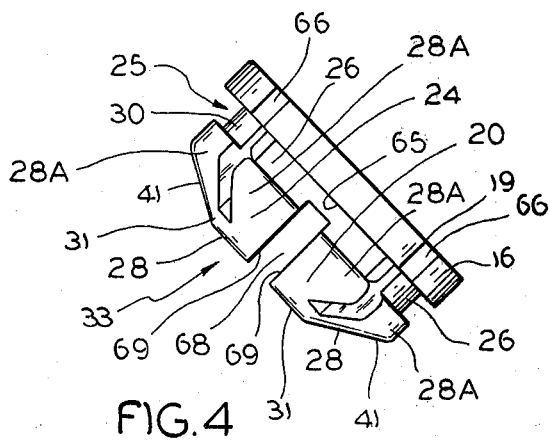
FIG. 4 is an edge view of the connector as viewed from the lower left hand quadrant of FIG. 2.

In effecting the positioning of FIG. 8, the installer will have applied the cable end 35 to the connector so oriented that the long dimension of the cable transverse cross-sectional configuration is aligned with one of the pairs of jaws 20 and 24, (jaws 20 in the showing of FIG. 8) and is roughly centered on the connector central axis 29. The cable end 35 is then pressed against the inside cam surfacing 45A and 45B of the jaws 20 to force them apart somewhat so that the narrow side edges 74 of the cable will be lodged in and be engaged by the respective gripping edges 62 of jaws 20 and the cable wide sides 76 will be engaged by the jaw rim portions 42 of jaws 24. By pressing the cable end 35 inwardly of the box, the jaws 20 and 24 are in effect cammed to the respective spread apart relation indicated in FIG. 8, which accommodates ready sliding movement of the cable 37 inwardly of the box 13 with respect to the connector 10. This also disposes the gripping edges 62 of the jaws 20 in abutting relation with the narrow sides 74 of the cable, and the gripping edges 62 of the jaws 24 in abutting relation with the wide sides 76 of the cable, as indicated in FIG. 8. The built in spring action of the connector fingers 28 effects a light pressing action of the jaw rim portions 42, and thus gripping edges 62, on the external surfacing of the cable sheathing, but without any penetration within the cable sheathing. Insertion of the cable end 35 within the box through the connector 10 also somewhat outwardly angles or tilts the jaw heads 31 so that their jaw end portions 40 project somewhat to the right of FIG. 1, on a somewhat expanded relation from the centered relation about axis 29 that is shown in FIGS. 1, 4 and 5, as indicated in FIGS. 7–9.

However, jaws 20 and 24 are arranged so the cable end 35 may be inserted through connector 10 in any other position of orientation, relative to jaws 20 and 24, about axis 29, with the objective that some combination of the rim portions 42, and their gripping edges 62, of jaws 20 and 24 will provide the resilient gripping and withdrawal movement preventing action referred to, without penetrating the cable sheathing.

In any event, as long as the cable 37 is pressed to the right of FIG. 7. the cable will move smoothly into the box through the connector 10 due to the cam follower type sliding action that the jaw heads 31 have on the cable sheathing. When the insertion movement stops, the jaws 20 and 24 will remain somewhat spread apart from the positioning indicated in FIGS. 1–6, with the jaws, and specifically their rim portions 42, bearing with light pressure on the cable sheathing, and lightly indenting into, but not penetrating the cable sheathing. The non-metallic nature of the jaw rim portions 42 and the bluntness of their gripping edges 62 avoids risk of actual severing of the sheathing surface.

Should tension develop on the cable 37 tending to move the cable to the left of FIG. 7, the frictional engagement that the jaws 20 and 24 have with the cable sheathing tends to draw the jaws 20 and 24 together in a collet like manner to swing toward closed position against the external surfacing of the cable to the extent permitted by the jaw cross spacing 68. This effects a further indentation of the jaw rim portions of the respective jaws, and specifically, their gripping edges 62, into the cable sheathing to provide a firm movement restraining hold thereon.

It will thus be seen that with regard to the oval type cable diagrammatically illustrated in FIG. 7, the jaws 20 and 24 accommodate ready sliding movement of the cable inwardly of the connector and into the box to the extent desired. Tendencies of cable movement in the opposite direction tend to swing the jaw heads 31 somewhat to the left of FIG. 7. and thus toward each other due to the purchase the jaws have on the cable by reason of the indentations that the jaw rim portions 42 make in the cable sheathing surfaces they engage in, that thereby lock the cable to the connector and thus to the box.

The connector 10 is thus in the nature of a self acting collet device in which the cable end being inserted into the box spreads apart the fingers 28 for slidingly accommodating the cable's insertion, and tendencies of the cable to move outwardly of the box swing the fingers 28 sufficiently in the opposite direction to lock the cable to the connector without causing any cutting or severing type penetration of the cable sheathing.

Figure 10:
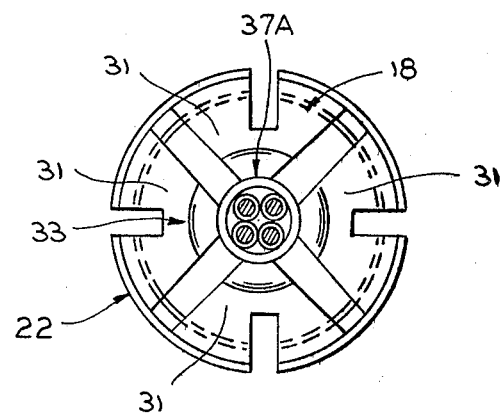

The connector jaws 20 and 24 are arranged to also accept round cable, for instance, the cable 37A that is diagrammatically illustrated in FIG. 10. Round cable is applied to the box through the connector 10 in a similar manner, with the cable end being pressed against the connector jaw inside cam surfaces 45A and 45B to separate the connector jaws 20 and 24, somewhat as indicated in FIG. 7, so that the cable can be slid inwardly of the connector jaws into the box. In this positioning of parts, the round cable becomes centered between the rim portions 42 of the jaws 20 and 24 substantially as indicated in FIG. 10. Again, as the cable is moved inwardly of the box, the cable sheathing slides smoothly over the jaw gripping edges 62, which edges are lightly pressed against the cable sheathing by the built in bias of the jaws that is occasioned by their being spread apart to insert the cable end into the box through the connector.

The connector jaws 20 and 24 act to hold the cable 37A against withdrawal in a similar action as described in connection with the cable 37, with the edges 72 indenting into the cable sheathing without cutting or severing the sheathing surface.

It will therefore be seen that the invention provides a connector for non-metallic sheathed cable that is of one piece construction and adapted for ready application to box outlet openings utilizing the snap fit connection that has been described and illustrated, and without requiring any special tools to apply the connector to the box or cable to the connector. The connector is free of clamps and other similar types of mechanical connecting devices, and no clamp acting on the cable end is required within the box in which the cable end extends.

The connector comprising the invention readily accepts both oval and round non-metallic sheathed cable with equal facility, and permits a ready sliding action on the cable end into the box. Movement tendencies of the cable in the opposite direction are immediately halted by the collet like closing action of the connector jaws on the cable.

While the connector is preferably made from nylon or its equivalent, the connector may also be formed from any other suitable plastic or polymeric material that is dielectric or electrically non-conductive. Metallic and other materials that which, if formed to a sharp edge or point, will readily sever the cable sheathing, should be avoided to avoid the possibility of the connector jaw teeth severing the cable sheathing.

While the connector 10 as illustrated has two pairs of the jaws 20 and 22, these jaws are all similarly formed and need not be in pairs. More or less numbers of such jaws may be employed, depending on the application, though connector 10 is illustrated in its preferred embodiment.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A connector for connecting non-metallic sheathed cable to electrical boxes in a knock-out opening thereof, said connector comprising:

an annular body formed from a resiliently flexible material, said body defining a ring shaped portion at one end of same and a collet comprising a plurality of opposed resilient jaws in spaced apart relation about the axis of said body at the other end of same, said jaws each comprising a finger having a base connected to said body ring shaped portion and a jaw head directed laterally of and toward said axis, with said jaw heads being disposed substantially transversely of said axis and converging toward said axis in a substantially common plane that is disposed normally of said axis, with said jaw heads being similarly spaced from said body ring shaped portion thereabout, said jaw heads defining outer sides facing away from said body ring shaped portion and inner sides facing said body ring shaped portion, said jaw heads at their respective terminal end portions each defining a blunt cable gripping edge, with said edges being directed toward said axis in confronting relation therewith in closely spaced relation thereabout, said jaw heads being oriented and spaced about said axis to be cammed away from said axis, when one end of either oval or round non-metallic sheathed cable is passed through said body ring portion and is thrust against said inner sides of same, at random positioning about said axis, to separate said jaws and pass the cable therebetween with said jaw gripping edges disposed in sliding relation to and being resiliently biased against the cable, and draw said jaws, by way of the frictional engagement of their gripping edges with the cable, toward said axis into indented collet type gripping relation with such cable on movement of the cable end in the opposite direction, said fingers at their said outer sides defining means for snap fit mounting of said body in the box knock-out opening between said ends of said body adjacent said finger bases, with said inner sides of said jaw heads facing outwardly of the box and said heads disposed within the box, whereby the cable end may be inserted into and through the connector by pressing the cable end against the jaw head inner sides to cam the jaws apart for sliding the cable therebetween, said jaws resiliently seat against the cable, and said jaws oppose withdrawal of same from the connector by being closed against the cable on tendencies of same to move outwardly of the box.

2. The connector set forth in claim 1 wherein:
said defining means of said fingers comprises said fingers having on their outer sides a circumferential recess, with said recesses of the respective fingers being adjacent said body ring shaped portion and aligned in a common plane extending transversely of said axis to define in said connector a circumferential seat adapted to receive the margin of the box wall defining the box knock-out opening,
said seat being spaced from said jaw heads axially of said body,
said defining means of said fingers further comprising said fingers each having on their said outer sides a cam surfacing interposed between the jaw head and said recess thereof whereby said fingers may be cammed toward each other by the box wall margin on pressing said finger outer side cam surfacings into the box knock-out opening from the outer side of the box wall to seat the box wall margin in said connector seat for seating the connector in the box knock-out opening.

3. The connector set forth in claim 2 wherein:
said body ring shaped portion is segmented for contraction thereof on camming of said fingers to seat the box wall margin in said seat.

4. The connector set forth in claim 3 wherein:
said body ring shaped portion segments and said fingers are consecutively integrally connected about the circumference of said connector.

5. The connector set forth in claim 4 wherein:
said connector body is of one piece construction and is formed from a self lubricating dielectric, non-metallic material.

6. The connector set forth in claim 2 wherein:
said gripping edges are curvilinear about said axis of said body as a center.

7. A connector for connecting non-metallic sheathed cable to electrical boxes in a knock-out opening thereof, said connector comprising:
an annular body formed from a resiliently flexible material, which body being concentric about the central axis of said body,
said body defining a ring shaped portion at one end of same and a collet comprising two pairs of opposed resilient jaws at the other end of same of which the jaws of each pair of jaws are in opposed spaced apart relation about said axis forming a collet for receiving the cable,
said jaws each comprising a finger having a base portion projecting from one end of said body ring shaped portion, axially of said body, and a jaw head directed laterally of and toward said axis,
with said jaw heads being disposed in substantially coplanar, confronting relation in a plane extending transversely of said axis and being similarly spaced from said body ring shaped portion one end thereabout,
said jaw heads being spaced apart circumferentially of said body,
said jaw heads defining outer sides facing away from said body ring shaped portion and inner sides facing said body ring shaped portion,
with said jaw head inner sides being concavely curvilinear along a common interior surface of revolution that is centered on said axis and said jaw head outer sides being concavely curvilinear along a common external surface of revolution that is centered on said axis,
with the jaw heads each defining a blunt gripping edge that is centered on the jaw head, with said edges being directed toward said axis in confronting relation therewith in closely spaced relation thereabout, and being intermediate said surfaces of revolution,
said jaws and their said gripping edges being oriented and spaced about said axis to be cammed away therefrom when one end of oval cable or cable of round transverse cross-sectional configuration is passed through said body ring portion and is thrust against said jaw head inner sides, at random positioning about said axis, to separate said jaws and pass the cable therebetween with said jaw gripping edges disposed in sliding relation to and being resiliently biased against the cable, and draw said jaws, by way of the frictional engagement of their gripping edges with the cable, toward said axis into indented collet type gripping relation with such cable on movement of the cable end in the opposite direction,
said fingers each having on their outer side a circumferential recess, with said recesses of the respective fingers being adjacent said body ring shaped portion and aligned in a common plane extending transversely of said axis to define in said connector a circumferential seat adapted to receive the margin of the box wall defining the box knock-out opening,
said heat being spaced from said jaw heads axially of said body,
said fingers each further having on their outer sides a cam surfacing interposed between the jaw head and said recess thereof whereby said fingers may be cammed toward each other by the box wall margin on pressing said finger outer side cam surfacings into the box knock-out opening from the outer side of the box wall to seat the box wall margin in said connector seat and thus seat the connector in the box knock-out opening,
whereby the cable end may be inserted into the box through the connector, with random positioning about said axis, by thrusting the cable end against the inner sides of said jaw heads, and said jaws resiliently seat against the cable end and slidably pass same therebetween, and said jaw heads are oriented to be drawn against said cable end, by said gripping edges thereof indenting into the cable, on tendencies of the cable end to be moved outwardly of the box.

8. The connector set forth in claim 7 wherein:
said body ring portion is segmented for contraction thereof on camming of said fingers toward said axis to seat the box wall margin in said seat.

9. The connector set forth in claim 8 wherein:
said body ring portion segments and said fingers are alternately integrally connected about the circumference of said connector.

* * * * *